United States Patent [19]

Studeny

[11] 3,780,848
[45] Dec. 25, 1973

[54] ARTICLE TRANSFERRING MECHANISM

[75] Inventor: Henry G. Studeny, La Grange Park, Ill.

[73] Assignee: Western Electric Company Incorporated, New York, N.Y.

[22] Filed: Sept. 13, 1972

[21] Appl. No.: 288,659

[52] U.S. Cl. ................................. 198/25, 198/210
[51] Int. Cl. ............................................ B65g 47/00
[58] Field of Search ............................ 198/25, 210

[56] References Cited
UNITED STATES PATENTS
3,490,575   1/1970   Herrmann ........................... 198/210

*Primary Examiner*—Richard E. Aegerter
*Assistant Examiner*—Joseph E. Valenza
*Attorney*—W. M. Kain et al.

[57] ABSTRACT

An article transfer wheel is formed from two circular discs, each having a plurality of article receiving indentations around the periphery thereof, mounted in a spaced relationship for rotation about an axis. Upon rotation of the transfer wheel successive elongated articles, from a supply of the articles, are received at each of their ends within an indentation on a different one of the discs at a first position along the periphery of the transfer wheel, and are rotated to a second position along the periphery of the transfer wheel which is arcuately spaced from the first position. Each article at the second position is pushed by one pair of successive pairs of clamping jaws in a direction to rotate the transfer wheel through the action of the pushed article upon the wheel. This causes the transfer wheel to rotate successive articles from the first position to the second position. As the following article rotates toward the second position, the pushed article is clamped within the pair of jaws to carry it out of its indentations and away from the transfer wheel as the following article reaches the second position. Repetition of the above sequence results in the serial transfer of articles from the supply of articles to successive clamping jaws.

10 Claims, 3 Drawing Figures ps://3,780,848

ARTICLE TRANSFERRING MECHANISM

BACKGROUND OF THE INVENTION

1. Field of the Invention

The present invention relates to article transferring mechanisms, and in particular to a mechanism for elevating successive elongated articles on a transfer wheel from a first position adjacent the periphery of the wheel to an article receiving conveyor at a second position adjacent the periphery of the wheel, wherein the driving force for rotating the wheel to elevate the articles is imparted to the wheel through the action of the article receiving conveyor upon the article at the second position.

2. Description of the Prior Art

In the manufacture of articles having an elongated configuration, such as axially leaded capacitors, it is often necessary, in order to maintain continuity in the manufacturing sequence, to continuously transfer the articles seriatim and in an oriented configuration from one assembly operation to a subsequent continuously moving assembly operation, or from an article storage area to a subsequent moving assembly operation. For example, if fabricated but untested axially leaded capacitors are introduced into a temporary storage area from a preceding fabricating operation, it may be desirable to continuously transfer the capacitors seriatim out of the storage area to a continuously moving testing device adapted to receive the leads of the capacitor in a particular orientation and to carry the capacitor away from the storage area for testing.

Often, a subsequent continuously moving operation (i.e., testing) is spaced from a preceding operation (i.e., introduction of the fabricated capacitors into a storage area), and in such a case it is necessary to provide a transfer device to continuously carry the articles the distance from one operation to the next. Presently employed transfer devices, such as conveyors, chain belts, or peripherally apertured wheels require synchronizing and drive mechanisms, such as timing gears, or belts, to drive the transfer devices and to maintain the articles conveyed thereby in registry with the following moving assembly operation to enable them to be received thereby. Not infrequently, such synchronizing and drive mechanisms are costly and subject to failure and maintenance.

It is an object of the present invention to provide an article transfer mechanism for continuously tranferring elongated articles seriatim to a continuously moving article receiving member, wherein the mechanism is driven by, and synchronized with, the receiving member, through the action of the receiving member upon the articles transferred thereto.

SUMMARY OF THE INVENTION

In accordance with the present invention, an article transferring mechanism includes a carrier, mounted for rotational movement, having facilities thereon for receiving and supporting articles upon rotation thereof, and a device for engaging an article within each of the supporting facilities. Also included is a mount for moving the article engaging device relative to and from the carrier in a plane essentially transverse to a plane perpendicular to the axis of rotation of the carrier, to move the supported article against the supporting facility and along with the engaging device and to rotate the carrier through the action of the moved article on the supporting facility. Further included is a mechanism which cooperates with the article engaging device after the engaged article has been moved a predetermined amount for gripping the moved article and for removing the gripped article from the associated supporting facility as the gripping mechanism moves away from the carrier.

In a preferred embodiment of the invention for transferring elongated articles seriatim from a supply of articles to a position above the supply of articles, first and second symmetrical article transfer wheels are mounted for rotation on a horizontal axis and are spaced apart a distance which is less than the longitudinal length of an article. Each wheel has a plurality of arcuately spaced pairs of leading and lagging teeth, around the periphery thereof, extending outward from the center of the wheel, the lagging tooth of each pair of teeth extending further outward from the center than the leading tooth of the pair, and both teeth of each pair forming an article receiving indentation therebetween.

To position articles within the article receiving indentations of the transfer wheels, a device operative upon rotation of the transfer wheels through an arc equal to the arcuate spacing between the indentations sequentially advances an individual one of the articles from the supply of articles to a first position, below the horizontal centerline of the transfer wheels, with the longitudinal axis of the article parallel to the axis of rotation of the wheels and with the article spaced from the axis a distance which is greater than the spacing of the leading tooth of each pair of teeth from the axis and less than the spacing of the lagging tooth of each pair of teeth from the axis, and with the end portions of the article extending outward from each wheel. At this point, each article is positioned to be pushingly engaged by the lagging teeth of a pair of teeth on each transfer wheel upon rotation of the wheels. As each article is pushed, a guide moves the article within the indentations associated with the lagging teeth which push the article to rotatably elevate successive articles within the indentations to a second position, arcuately spaced from the first position, above the horizontal centerline of the transfer wheels and before the vertical centerline of the transfer wheels.

A plurality of pairs of article receiving jaws, adapted to secure an article therebetween, are mounted for sequential movement along a horizontal path relative to and from the transfer wheels and into pushing engagement with the end portions of an article in the second position, in a direction substantially perpendicular to the axis of rotation of the transfer wheels, to push the article against the leading teeth of its associated indentations in a direction to rotate the article transfer wheels about their axis through the action of the pushed article on the leading teeth. After the pushed article is rotated to the vertical centerline of the transfer wheels, a mechanism is rendered effective for clamping the article whithin the pushing pair of jaws to continue to push the article a distance sufficient to rotate the following article to the second position and to then carry the article out of its associated indentations as the leading teeth are rotated downward with rotation of the transfer wheels.

Other objects, advantages and features of the invention will be apparent upon consideration of the follow-

DETAILED DESCRIPTION

Figure 1:
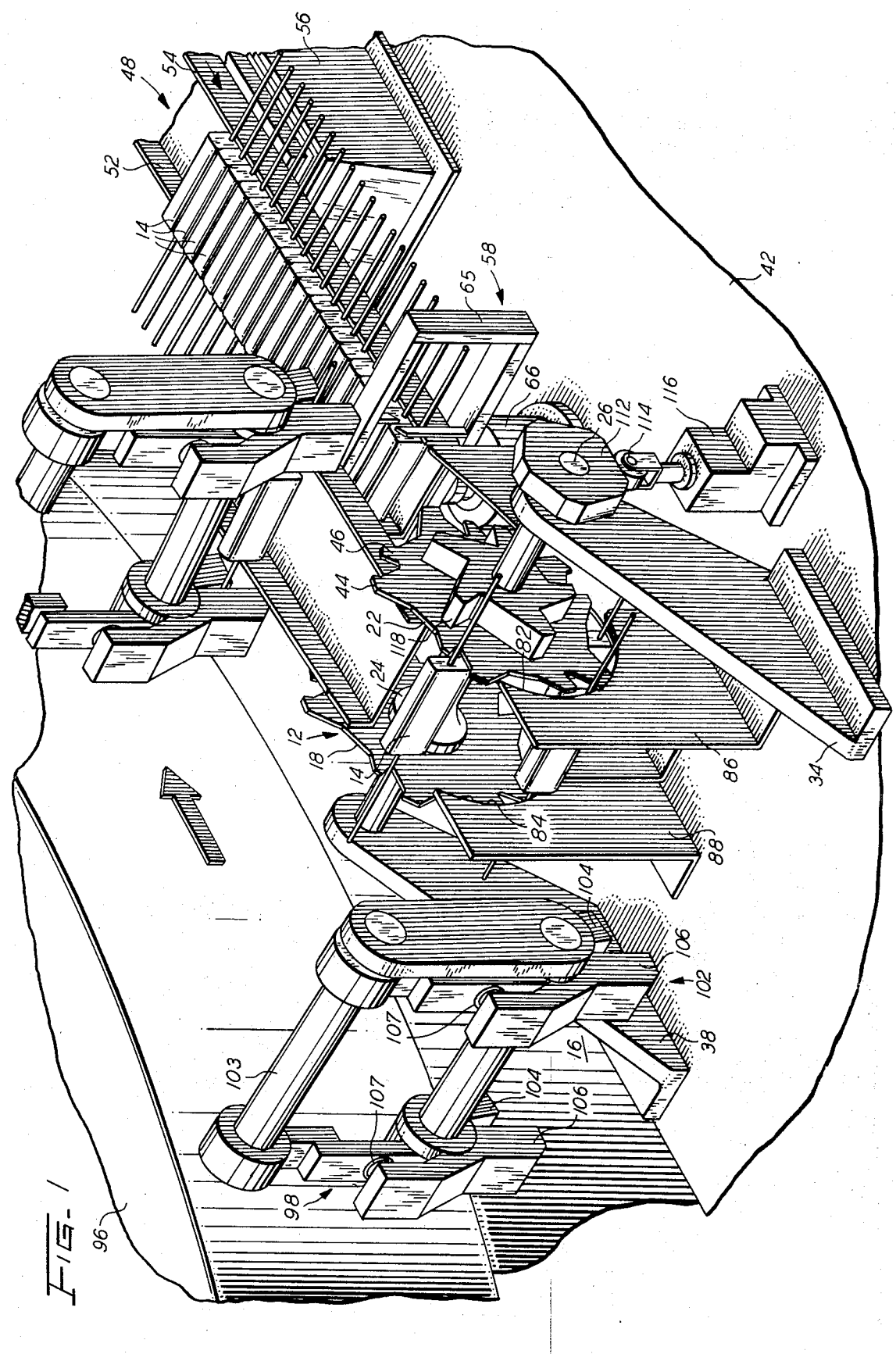
FIG. 1 is a perspective view of a transfer mechanism for conveying elongated articles from a first position to an elevated second position in accordance with the principles of the invention.

The article transferring mechanism of the present invention as shown in the drawings, for conveying articles seriatim from a first position to individual ones of a plurality of moving article receiving members at a second position, and more particularly for serially elevating elongated, axially leaded capacitors from a storage area to a position whereat the leads of successive capacitors are each clamped between one pair of sequential pairs of moving jaws, includes an article transfer wheel 12 rotatably mounted about a horizontal axis for elevating axially leaded capacitors 14, along the periphery thereof, into a position whereat successive capacitors 14 are engaged by an individual pair of a plurality of pairs of clamping jaws 16 which move about a vertical axis. Each of the pairs of clamping jaws 16 initially pushes a capacitor 14 in a direction to rotate the transfer wheel 12 through the interaction between the leads of the capacitor 14 and the transfer wheel 12, and then clamps onto the leads of the capacitor 14 to carry the capacitor away from the periphery of the transfer wheel and to rotate the transfer wheel sufficiently to bring the following capacitor 14, on the periphery thereof, into the position to be pushed by the following pair of clamping jaws 16.

Figure 2:
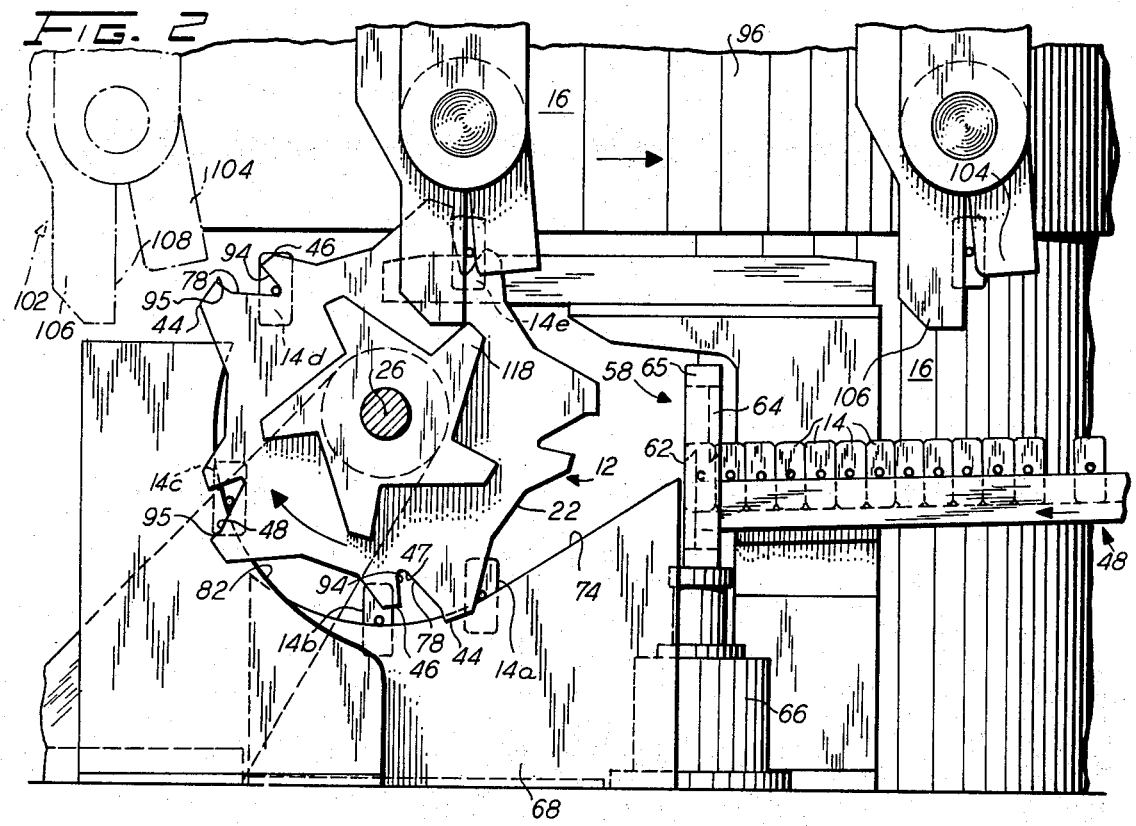
FIG. 2 is a side elevation view of the transfer mechanism illustrating successive articles being elevated from the first to the second position for engagement by article receiving members.
Figure 3:
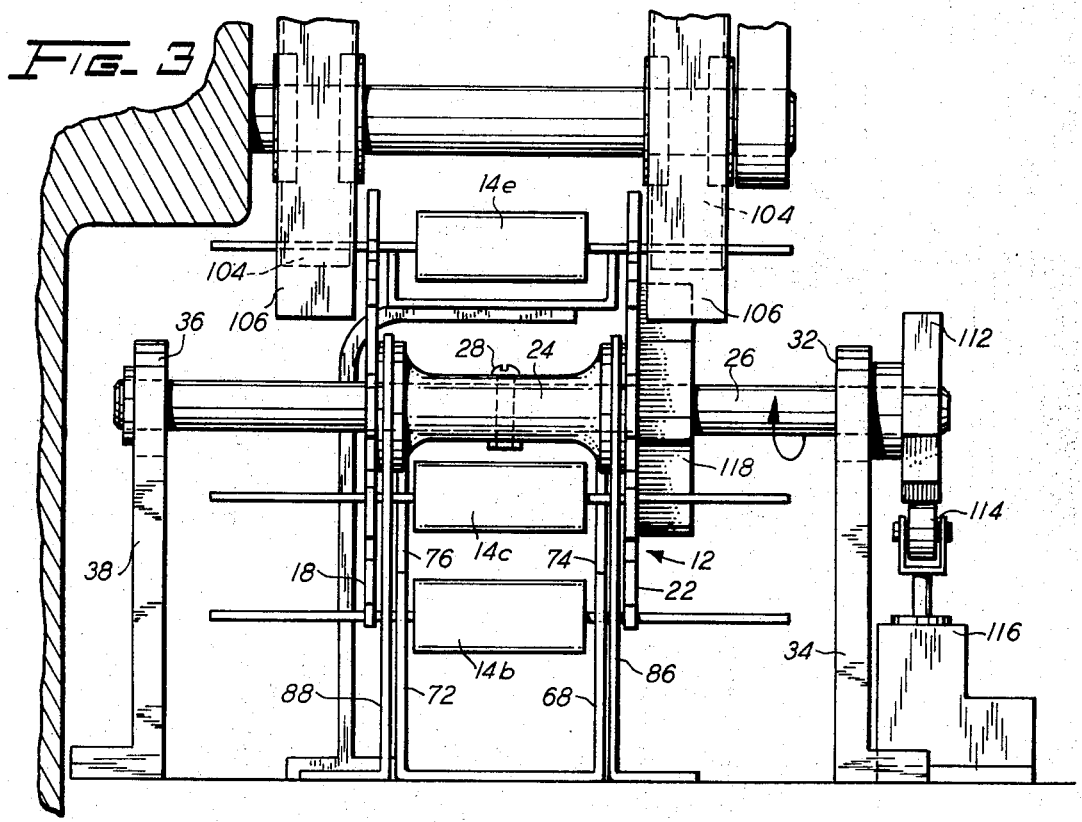
FIG. 3 is an end elevation view of the transfer mechanism showing the arrangement of an article receiving member with respect to an article on the transfer mechanism.

More particularly, referring to FIGS. 1-3, the transfer wheel 12 is comprised of two identical discs 18 and 22 secured at the ends of a spacer 24 in a coplanar relationship. The transfer wheel 12 is mounted on a shaft 26 which extends through the centers of the discs 18 and 22 and the spacer 24, and is secured to the shaft for rotation therewith by any convenient means, such as by a pin 28 extending through the spacer 24 and the shaft 26. The shaft 26, and therefore the transfer wheel 12, is mounted for rotation about a horizontal axis within a bearing 32 in a mounting bracket 34 at one of its ends and within a bearing 36 in a mounting bracket 38 at the other of its ends, the mounting brackets 34 and 38 being supported on a base plate 42.

Each of the discs 18 and 22 has formed on the periphery thereof a plurality of spaced pairs of radially extending lagging and leading teeth 44 and 46, respectively, each pair of teeth 44 and 46 forming an indentation 47 therebetween adapted, as will be later set forth, to receive a lead of a capacitor 14. The discs 18 and 22 are secured to the ends of the spacer 24 in a relationship such that corresponding teeth 44 and 46 on each of the discs lie along a line defined parallel to the axis of rotation of the shaft 26. As may best be seen by reference to FIG. 2, the lagging teeth 44 on each of the discs 18 and 22, lagging with respect to the direction of rotation of the discs as shown by the direction arrow, extend radially outward from the axis of rotation of the dics a distance which is greater than the distance which the leading teeth 46 extend outward from the axis of rotation of the discs.

The capacitors 14 to be serially elevated by the transfer wheel 12 are initially maintained in a closely spaced parallel arrangement in a storage area, such as within a trackway 48 of a vibratory feeder. As shown, the capacitors 14 are positioned within the trackway 48 in a perpendicular orientation with respect to two walls 52 and 54, which define the side portions of the trackway 48, such that the main body portion of each capacitor 14 is received between the two side walls 52 and 54 with the axially extending leads of each capacitor resting upon the top surfaces of the walls 52 and 54 and extending perpendicularly therefrom. The capacitors 14 may be placed within the trackway 48 by any expedient method, such as by a manual operation or by an automated insertion device from a preceding fabricating operation.

Actuation of a vibratory motor 56, coupled to the trackway 48, urges the capacitors 14 in the trackway 48 to the left, as shown by the directional arrow, to a position whereat the leads of the leftwardmost capacitor are blocked by an escapement mechanism 58 with the following capacitors in a closely spaced parallel relationship behind it. The escapement mechanism 58, positioned at the leftwardmost or capacitor discharge end of the trackway 48, is comprised of two pairs of blocking pawls 62 and 64 supported on a rectangular framework 65 for vertical movement therewith in response to actuation of a solenoid 66. The pairs of blocking pawls 62 and 64 are positioned on opposite sides of the trackway 48, with a different pair of blocking pawls adjacent to each of the walls 52 and 54, for blocking engagement with opposite leads of the leftwardmost capacitor 14. With the solenoid 66 unactuated and the framework 65 in its uppermost position, as shown in FIG. 2, the leads of the leftwardmost capacitor are urged against the blocking pawls 62 which block the passage of the capacitor therepast. Upon actuation of the solenoid 66, downward movement of the framework 65 moves the pairs of blocking pawls 62 and 64 downward to permit the leftmost capacitor to move over and past the blocking pawls 62, and over the end of the trackway 48, and to bring the blocking pawls 64 into a position to block leftward movement of the following capacitor therepast. When the solenoid 66 is again deactuated and the pairs of blocking pawls 62 and 64 move upward, the following capacitor, which was blocked by the pawls 64, is advanced leftward under the pawls 64 by the vibratory track 48 and into engagement with the now raised blocking pawls 62 which prevent further movement thereof.

Two vertical supports 68 and 72 having downward sloping upper surfaces 74 and 76, respectively, are secured to the base plate 42 and positioned in line with the walls 52 and 54 of the trackway 48 at the capacitor discharge end of the trackway to receive, on each of the sloping surfaces 74 and 76, a different lead of the capacitor passed through the escapement mechanism 58 and over the discharge end of the vibratory track 48. The spacing between the supports 68 and 72 is such that the body portion of the capacitor is longitudinally received therebetween, and the slope of the surfaces 74 and 76 is such that the capacitor is gravitationally carried downward, with the leads of the capacitor sliding along the sloping surfaces 74 and 76, to a position (shown by the capacitor 14a) beneath the horizontal axis of rotation of the transfer wheel 12. At this position, the leads of the capacitor 14a are radially spaced from the axis of rotation of the wheel 12 a distance which is greater than the distance of the leading teeth 46 on the discs 18 and 22, to prevent engagement of the leads thereby, but which is less than the distance of the lagging teeth 44, to permit engagement of the leads by an edge 78 of the teeth 44. For each rotation of the transfer wheel 12 through an arc equal to the arcuate spacing between adjacent pairs of teeth 44 and 46, the arrangement is such that the solenoid 66 is actuated to pass a capacitor through the escapement mechanism 58 and onto the downwardly sloping surfaces 74 and 76.

As the transfer wheel 12 rotates in a clockwise direction, individual capacitors 14 are sequentially passed through the escapement mechanism 58, are engaged along their leads by the edges 78 of successive sets of teeth 44, and are advanced by the edges 78 along the surfaces 74 and 76 to a position whereat each lead of the capacitor engages and follows, under the urging of the edges 78, a different arcuate guide surface 82 and 84 formed in two upright supports 86 and 88, respectively. The supports 86 and 88 are secured to the base plate 42 in proximity with, and in a plane parallel to, the supports 68 and 72, respectively, and the arcuate guide surfaces 82 and 84 extend, as best shown in FIG. 2, from a position below the horizontal centerline of the transfer wheel 12 to a position above the horizontal centerline and before the vertical centerline of the transfer wheel, in close proximity with the peripheries of the discs 18 and 22, respectively.

The configuration of the guide surfaces 82 and 84 is such that the leads of a capacitor advancing along the surfaces 74 and 76 experience a smooth transistion in passing from the surfaces 74 and 76 to the surfaces 82 and 84, and are urged within the indentations 47 defined between the pairs of teeth 44 and 46. In this manner, each lead of a capacitor being elevated along the periphery of the transfer wheel 12 is maintained within an indentation 47 in an area defined by the edge 78 of a tooth 44, an edge 94 of a tooth 46, and one of the sloping surfaces 82 or 84, with the body portion of the capacitor longitudinally received between the discs 18 and 22. The positions of several capacitors positioned to be elevated, or being elevated, along the periphery of the transfer wheel 12 are shown by the capacitors 14a, 14b, 14c and 14d.

As each capacitor is rotatably elevated along the periphery of the transfer wheel 12 from a first position below the horizontal centerline of the transfer wheel to a second position, arcuately spaced from the first position, beyond the ends of the guide surfaces 82 and 84 and above the horizontal centerline, and before the vertical centerline, of the transfer wheel 12, such as has been the capacitor 14d, it is gravitationally maintained, with the aid of a lip 95 formed in the edges 78 of the teeth 44, within the indentations 47 with its leads extending parallel to the axis of rotation of the transfer wheel 12 and with its main body portion maintained between the discs 18 and 22. At this point, the capacitor is positioned to be engaged by one pair of a plurality of pairs of moving clamping jaws 16 which are spaced about the periphery of a rotating turntable 96 and extend radially therefrom. The diameter of the rotating turntable 96 is sufficiently large so that each pair of clamping jaws 16 may be considered to be moving in an essentially transverse path at the point of its engagement with a capacitor.

Each pair of clamping jaws 16 is comprised of a first set of solenoid actuated jaws 98 and a second set of solenoid actuated jaws 102 supported on an arm 103 secured to the periphery of the turntable 96. Each set of jaws 98 and 102 has a leading jaw 104 and a lagging jaw 106 which are leading and lagging, respectively, with respect to the direction of rotation of the turntable 96 as shown by the directional arrow, and which are movable, upon actuation of a solenoid 107, to clamp an article therebetween. The jaws 98 and 102 on a pair of jaws 16 are each adapted to clampingly receive a different lead of a capacitor 14 with the body portion of the capacitor extended therebetween, and are preferably formed of an electrically conductive material, with electrical isolation therebetween, to permit a clamped capacitor to be electrically tested through signals applied to each of the jaws 98 and 102. However, it is to be appreciated that the jaws 98 and 102 may be constructed of a non-electrically conductive material in the event that it is merely desired to clamp a capacitor therebetween without performing electrical tests thereon.

As best shown in FIGS. 2 and 3, the lagging jaw 106 of each set of jaws 98 and 102 extends downward toward the capacitors a distance further than the leading jaw 104, and the spacing between the essentially transversely moving jaws 98 and 102 is sufficient to permit passage of the discs 18 and 22 of the transfer wheel 12 therebetween, but is less than sufficient to permit passage of the leads of a capacitor therebetween. The mounting of each pair of jaws 16 on the turntable 96 with respect to the transfer wheel 12 is such that, upon rotation of the turntable 96, successive sets of jaws 98 and 102 are advanced around the discs 18 and 22 and into engagement with the leads of a capacitor carried on the transfer wheel 12 in the position shown by the capacitor 14d. At this point, the difference in length between the jaws 104 and 106 is such that the leading jaws 104 pass over the leads of the capacitor while a leading surface 108 of the lagging jaws 106 pushingly engages the leads of the capacitor.

Continued advancement of the sets of jaws 98 and 102 with rotation of the turntable 96 forces the leads of the capacitor 14d, under the urging of the surfaces 108, against the edges 94 of the teeth 46 to rotate the transfer wheel 12 in the clockwise direction. This rotatably advances the capacitor 14d toward the vertical centerline of the transfer wheel 12 and elevates successive capacitors along the periphery of the transfer wheel. As the capacitor 14d is rotated within the indentations 47 toward its apogee, or the vertical centerline of the transfer wheel 12, it is further elevated by the transfer wheel to a position whereat opposite leads thereof extend between the leading jaw 104 and the lagging jaw 106 of each of the sets of jaws 98 and 102. When the capacitor reaches the vertical centerline of the transfer wheel 12, the solenoids 107 are actuated to close the jaws 98 and 102 to secure the leads of the capacitor therebetween. It is to be noted that a spring, rather than the actuable solenoid 107, could be employed to normally urge the jaws 98 and 102 to a closed position, so that as the capacitor 14d is rotated toward its apogee the leads thereof are forced between the jaws 98 and 102 to be retained thereby. The sets of jaws 98 and 102 then carry the capacitor in a horizontal path past the vertical centerline of the transfer wheel, while continuing to cause rotation of the transfer wheel through the action of the clamped leads of the capacitor against the edges 94 of the teeth 46, to a position depicted by the capacitor 14e. At this point, as a result of the continued rotation of the transfer wheel 12, the following capacitor 14c has been elevated into a position to be engaged by the surfaces 108 of a following set of jaws 98 and 102, and the teeth 46, which were acted upon by the leads of the clamped capacitor 14d, have been rotated downward sufficiently to permit the horizontally carried, clamped capacitor to be carried out of its indentations 47, over the top of the teeth 46, and away from the transfer wheel 12.

Cyclical repetition of the above described sequence elevates successive capacitors 14 on the periphery of the transfer wheel 12 to be engaged and carried away from the transfer wheel 12 by successive pairs of jaws 16. It is to be noted that no drive mechanism has been provided to rotate and synchronize the transfer wheel 12 with respect to the moving pairs of jaws 16, but rather rotation and synchronization of the transfer wheel 12 with respect to the pairs of jaws 16 is accomplished through the action of the capacitors elevated by the transfer wheel, and engaged by the pairs of jaws 16, upon the transfer wheel.

To synchronize the closure of the pairs of clamping jaws 16 and the actuation of the escapement mechanism 58 with the rotation of the transfer wheel 12, a cam 112 is secured to an end of the shaft 26 for rotation therewith. Associated with the cam 112 is a follower 114 for alternately opening and closing a switch 116 to control the actuation of the escapement mechanism 58 and of the solenoids 107. The configuration of the cam 112 is such that as a pair of jaws 16 pass the vertical centerline of the transfer wheel 12, the solenoids 107 are actuated to close the jaws to clamp the leads of a capacitor therebetween and the solenoid 66 is actuated to advance a capacitor through the escapement mechanism 58 and onto the sloping surfaces 74 and 76.

To initiate elevation of capacitors 14 by the transfer wheel 12 if no capacitors are initially positioned along the periphery of the transfer wheel, or to maintain continuity in the transferring operation in the event that a capacitor 14 is missing between a pair of teeth 44 and 46, a toothed member 118, secured to the shaft 26, is configured to be engaged along a tooth thereof by a lagging jaw 106 of a set of jaws 102, which would otherwise engage a lead of a capacitor in the position of the capacitor 14d. This rotates the transfer wheel 12 to elevate the capacitors 14 along the periphery of the transfer wheel until a capacitor is in the position of the capacitor 14d, at which point the capacitor, and not the toothed member 118, is engaged by a following pair of jaws 16. The arrangement is such that each time the toothed member 118 is engaged by a jaw 106, the transfer wheel 12 is rotated through an arcuate spacing equal to the arcuate spacing between adjacent indentations 47.

While one particular embodiment of the invention has been described in detail, it is to be understood that other modifications and embodiments may be devised by one skilled in the art without departing from the spirit and scope of the invention.

What is claimed is:

1. In an article transfer system:
   a carrier mounted for rotational movement;
   support means on the carrier for receiving and supporting articles as the carrier rotates;
   means for engaging an article within each of the support means;
   means mounting the engaging means for movement relative to and from the carrier in a plane essentially transverse to a plane perpendicular to the axis of rotation of the carrier and into the path of movement of articles on the carrier to pushingly move the supported article against the support means to rotate the carrier through the action of the engaging means moving the article against the support means, and
   means for gripping an article, after the article has been moved a predetermined amount by the engaging means, and for removing the gripped article from the associated support means as the engaging means moves away from the carrier.

2. In an article transfer system as recited in claim 1, wherein the carrier is mounted for rotation about a horizontal axis, further including:
   means for mounting the engaging means for movement about a vertical axis.

3. In an article transfer system as defined in claim 1, further including:
   a pair of spaced plates having cam surfaces for receiving each article in position to be initially engaged by the receiving and supporting means and for then guiding each engaged article into the supporting means, the cam surfaces terminating prior to the point where the engaging means engages an article.

4. In a system as defined in claim 3:
   an escapement device for depositing articles seriatim onto the pair of spaced plates;
   means for urging a supply of articles against said escapement device, and
   means cyclically operated by an incremental rotation of the carrier for operating the escapement device to deposit an article onto the pair of spaced plates.

5. In a system for transferring articles advancing from a storage facility:
   a rotatably mounted transfer wheel having indentations for receiving articles;
   an arcuate guide having a cam surface for receiving articles advancing from the storage facility and for guiding each moving article therealong and into an indentation as the wheel rotates;
   a pusher means mounted for movement relative to and from the transfer wheel and into the path of movement of articles on the transfer wheel for engaging and pushing each successive article positioned in an indentation to rotate the wheel through the action of the pushed article upon the wheel;
   means projecting from the wheel for engaging the articles on the arcuate guide and for advancing the articles along the cam surface and into the indentations;
   means for gripping pushed articles and for withdrawing the articles from the indentations upon movement of the pusher means away from the transfer wheel, and means operated by the transfer wheel rotating through a predetermined amount for advancing articles from the storage facility onto the arcuate guide.

6. In a system for transferring articles advancing seriatim from an article supply area to continuously moving article receiving members:

a rotatably mounted article transfer wheel having article receiving indentations peripherally spaced thereon;

means operated by the transfer wheel rotating through an incremental amount for advancing each article seriatim from the supply area to a first position adjacent the periphery of the transfer wheel;

means rendered effective upon rotation of the wheel for moving individual ones of the articles at the first position into successive indentations of the transfer wheel to rotate the articles to a second position;

means mounting the article receiving members for successive movement of single ones of the article receiving members past the second position, in a direction substantially perpendicular to the axis of rotation of the transfer wheel and into the path of movement of articles in the indentations on the transfer wheel, into pushing engagement with individual ones of successive articles at the second position to push each article against the wheel to rotate the wheel through the action of the pushed article on the wheel, and means for securing a pushed article to each article receiving member, after the pushed article has rotated the wheel an amount sufficient to rotate the following article to the second position to be pushingly engaged by the following article receiving member, to remove the pushed article from its associated indentation upon continued movement of the article receiving member past the second position.

7. In a system as recited in claim 6, wherein the means for serially advancing articles to the first position comprises:

means for holding a supply of the articles above the first position;

a downwardly sloping trackway extending between the supply holding means and the first position for gravitationally conveying articles introduced thereon from the supply to the first position, and an escapement devices operative upon the incremental rotation of the wheel for serially introducing articles from the supply means onto the trackway.

8. In a mechanism as recited in claim 7, wherein the means for moving the articles into the indentations comprises:

an arcuate guide, extended along the periphery of the transfer wheel between the first and second positions and spaced a gradually decreasing distance from the axis of rotation of the transfer wheel as it extends toward the second position, for urging the engaged articles into the indentations as the articles are rotated from the first to the second position.

9. In an article transfer system for transferring elongated articles advancing seriatim from a supply of articles to a position above the supply of articles:

first and second symmetrical article transfer wheels mounted for rotation on a horizontal axis and spaced apart a distance which is less than the longitudinal length of an article, each wheel having a plurality of arcuately spaced pairs of leading and lagging teeth around the periphery thereof extending outward from the center of the wheel, the lagging tooth of each pair of teeth extending further outward from the center than the leading tooth of the pair, and both teeth of each pair forming an article receiving indentation therebetween;

means operated by the transfer wheels rotating through an arc equal to the arcuate spacing between the indentations for advancing an individual one of the articles from the supply of articles to a first position below the horizontal centerline of the transfer wheels, with the longitudinal axis of the article parallel to the axis of rotation of the wheels and with the article spaced from the axis a distance which is greater than the spacing of the leading tooth of each pair of teeth from the axis and less than the spacing of the lagging tooth of each pair of teeth from the axis, and with the end portions of the articles extending outward from each wheel, to be pushingly engaged by the lagging teeth of a pair of teeth on each transfer wheel upon rotation of the wheels;

guide means operative upon rotation of the wheels for moving each pushed article within the indentations associated with the lagging teeth which engage the article, to rotatably elevate successive articles within the indentations to a second position arcuately spaced from the first position and above the horizontal centerline of the transfer wheels and before the vertical centerline of the transfer wheels;

a plurality of pairs of article receiving jaws adapted to secure an article therebetween;

means mounting the pairs of jaws for sequential movement along a horizontal path relative to and from the transfer wheels and into the path of movement of articles in the indentations on the transfer wheels and into pushing engagement with the end portions of an article in the second position, in a direction substantially perpendicular to the axis of rotation of the transfer wheels, to push the article against the leading teeth of its associated indentations in a direction to rotate the article transfer wheels about their axis through the action of the article on the leading teeth, and means for clamping the pushed article within the pushing pair of article receiving jaws, after the article is rotated to the vertical centerline of the transfer wheels, to continue to push the article in a horizontal direction a distance sufficient to rotate the following article to the second position and to then carry the article out of its associated indentations as the leading teeth are rotated downward with rotation of the transfer wheels.

10. In an apparatus for transferring articles advancing from a storage facility:

a transfer wheel mounted for rotation and having a plurality of evenly spaced first teeth and a plurality of evenly spaced second teeth, the first and the second teeth defining indentations therebetween for receiving articles, and the second teeth being longer than the first teeth;

a guide plate for supporting and guiding advancing articles from the storage facility to a position to be pushingly engaged by the second teeth upon rotation of the transfer wheel;

a cam plate for engaging and pushing articles engaged by the second teeth into the indentations;

means for engaging and moving articles positioned in the indentations to force the articles against the first teeth to rotate the transfer wheel through the action of the article on the first teeth, and means operated by the transfer wheel rotating through a predetermined amount for advancing the articles seriatim from the storage facility onto the guide plate.

* * * * *